(12) United States Patent
Woo et al.

(10) Patent No.: US 11,850,543 B2
(45) Date of Patent: Dec. 26, 2023

(54) DESULFURIZER

(71) Applicant: LG Electronics Inc., Seoul (KR)

(72) Inventors: Hyoungsuk Woo, Seoul (KR); Dongkeun Yang, Seoul (KR); Hyungsoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 790 days.

(21) Appl. No.: 16/999,514

(22) Filed: Aug. 21, 2020

(65) Prior Publication Data
US 2021/0057769 A1   Feb. 25, 2021

(30) Foreign Application Priority Data

Aug. 23, 2019 (KR) .................. 10-2019-0103763

(51) Int. Cl.
*B01D 53/04* (2006.01)
*B01D 53/48* (2006.01)
*H01M 8/0662* (2016.01)
*C10L 3/10* (2006.01)
*H01M 8/04044* (2016.01)

(52) U.S. Cl.
CPC ..... *B01D 53/0423* (2013.01); *B01D 53/0446* (2013.01); *B01D 53/48* (2013.01); *C10L 3/103* (2013.01); *H01M 8/0675* (2013.01); *B01D 2256/24* (2013.01); *B01D 2257/30* (2013.01); *B01D 2259/45* (2013.01); *H01M 8/04044* (2013.01)

(58) Field of Classification Search
None
See application file for complete search history.

(56) References Cited

U.S. PATENT DOCUMENTS

| 413,514 A | * | 10/1889 | Jarrell | .................. F28C 1/00 261/109 |
| 2012/0097031 A1 | * | 4/2012 | McClelland | ........... B01D 53/18 261/115 |

* cited by examiner

*Primary Examiner* — Gabriel E Gitman
(74) *Attorney, Agent, or Firm* — Fish & Richardson P.C.

(57) ABSTRACT

Disclosed is a desulfurizer of a fuel cell. The desulfurizer includes a pipe extended long and having one side that is open and the other side that is closed; a cap coupled to one side of the pipe and closing the pipe; a plurality of baffles installed in an inner space of the pipe and sequentially partitioning the inner space in a direction crossing a length direction of the pipe; an inflow pipe penetrating through the cap and the plurality of baffles and communicating from the outside of the pipe to the inner space of the pipe; and an outflow pipe installed in the cap and communicating the outside of the pipe and the inner space of the pipe.

6 Claims, 5 Drawing Sheets

DESULFURIZER

CROSS-REFERENCE TO RELATED APPLICATION

This application claims the priority from Korean Patent Application No. 10-2019-0103763, filed on Aug. 23, 2019, the disclosure of which is incorporated herein by reference in its entirety.

BACKGROUND OF THE INVENTION

1. Field of the Invention

The present disclosure relates to a desulfurizer used in a fuel cell system.

2. Description of the Related Art

Among the city gases currently being supplied in Korea, odorant made of organic sulfur compounds such as tetrahydrothiophene THT and t-butylmercaptan TBM are mixed at a ratio of 7:3 so as to check whether gas is leaking, and the total concentration of the odorant is known to be about 4 ppm (15 mg/m3).

Odorant is also included in liquefied petroleum gas LPG, and its main component is dimethylsulfide DMS and t-methylmercaptan TBM, and the total content of the odorant is limited to about 30 ppm.

The organic sulfur compound odorant mixed with city gas and liquefied petroleum gas has a unique odor of sulfur. Users can easily check whether the colorless, odorless city gas or liquefied petroleum gas is leaked. It may be regarded as necessary in order to prevent accidents caused by gas leakage.

The chemical energy of hydrogen and oxygen contained in hydrocarbon-based materials such as city gas and liquefied petroleum gas can be produced and used as electrical energy depending on the purpose of use, and a power generation system that converts chemical energy into electrical energy is a fuel cell system.

The fuel cell system schematically includes a stack that produces electricity, a mechanical balance of plants (M-BOP) including a reformer that converts city gas, which is fuel for the fuel cell, into hydrogen, and an electrical balance of plants (E-BOP) for controlling a battery and converting DC into AC to supply stable electricity.

Meanwhile, in a fuel cell system, in order to directly produce electric energy from chemical energy of hydrogen and oxygen contained in hydrocarbon-based materials such as city gas and liquefied petroleum gas, it is necessary to remove the odorant made of sulfur compounds that was added to check for gas leakage. The reason is that if the odorant is not removed, there is a problem of causes poisoning of the reforming catalyst and the stack of the fuel cell. Accordingly, it should be used in the state where sulfur is removed by at least 0.2 ppm up to several ppb.

In order to remove the sulfur compound used as an odorant, a high temperature (250 to 350° C.) desulfurization process is usually applied, but in the fuel cell, a room temperature desulfurization method is used in consideration of efficiency.

Particularly, the room temperature desulfurization method is a desulfurization method by adsorption, and is usually configured to remove sulfur by separately configuring an adsorption catalyst, a primary catalyst, and a secondary catalyst in a reactor. A desulfurizing apparatus (desulfurizer) to which such a desulfurization method is applied is included in the mechanical balance of plants (MBOP) in the fuel cell system.

Korean Patent Publication No. 10-2014-0045970 (see FIG. 1) discloses a room temperature desulfurizing apparatus for a fuel cell that includes a gas inflow body 100 for guiding a city gas or liquefied petroleum gas to flow into a desulfurizing apparatus (S) and preventing the gas introduced into the desulfurizing apparatus (S) from leaking, an adsorption catalyst assembly 200 for adsorbing and removing sulfur compounds by passing the city gas or liquefied petroleum gas introduced into the desulfurizing apparatus (S) through one or two or more types of adsorbents, a desulfurization catalyst assembly 300 capable of mounting a desulfurization catalyst for removing sulfur compounds contained in the city gas or liquefied petroleum gas that passed through the adsorption catalyst assembly 200, and a gas discharge body 400 which guides to discharge the gas from which the sulfur compound contained in the city gas or liquefied petroleum gas is removed to a later process and is equipped with a dust filter 420 for removing fine dust contained in the gas, wherein the gas inflow body 100, the adsorption catalyst assembly 200, the desulfurization catalyst assembly 300, and the gas discharge body 400 that have the shape of a pipe are separated and integrated with each other so that the adsorption catalyst and the desulfurization catalyst can be exchanged at any time. Meanwhile, an expansion portion 110,210,310,410 is selectively formed so that the gas inflow body 100, the adsorption catalyst assembly 200, the desulfurization catalyst assembly 300, and the gas discharge body 400 are separated from each other and integrally configured, and a joint means 500 is provided so that the expansion portion 110,210,310,410 can maintain gas tight.

However, the above mentioned desulfurizing apparatus needs to check the state of the desulfurization material through a number of windows, so it is difficult to accurately determine. Further, since it has a lot of fastening structure for the replacement of the desulfurization material, there is a high risk of gas leakage, and the reaction rate is decreased due to the occurrence of internal dead zone.

SUMMARY

The present disclosure has been made in view of the above problems, and provides a desulfurizer for a fuel cell system that can extend the performance and life of a desulfurizing apparatus.

The present disclosure further provides a desulfurizer for a fuel cell system capable of improving gas leakage.

The present disclosure further provides a desulfurizer for a fuel cell system capable of improving a dead zone.

In accordance with an aspect of the present disclosure, a desulfurizer includes: a pipe extended long and having one side that is open and the other side that is closed; a cap coupled to one side of the pipe and closing the pipe; a plurality of baffles installed in an inner space of the pipe and sequentially partitioning the inner space in a direction crossing a length direction of the pipe; an inflow pipe penetrating through the cap and the plurality of baffles and communicating from the outside of the pipe to the inner space of the pipe; and an outflow pipe installed in the cap and communicating the outside of the pipe and the inner space of the pipe.

In accordance with another aspect of the present disclosure, the inflow pipe has one end that is positioned outside of the pipe, and has the other end that is adjacent to the closed other side of the pipe.

In accordance with another aspect of the present disclosure, the plurality of baffles include a first baffle positioned adjacent to the other end of the inflow pipe; and a second baffle positioned between the first baffle and the cap, wherein parts of the first baffle and the second baffle are overlapped in a longitudinal direction of the pipe.

In accordance with another aspect of the present disclosure, the desulfurizer further includes a first distribution plate positioned between the first baffle and the other end of the inflow pipe, and partitioning the inner space of the pipe in a direction crossing the longitudinal direction of the pipe; and a second distribution plate for partitioning the inner space of the pipe and an inner space of the cap, wherein the first distribution plate and the second distribution plate are a perforated plate.

In accordance with another aspect of the present disclosure, the desulfurizer further includes a desulfurizing agent filled in the inner space of the pipe between the first distribution plate and the second distribution plate; and a discoloration indicator filled in the inner space of the cap.

In accordance with another aspect of the present disclosure, the desulfurizer further includes a third baffle positioned between the second baffle and the second distribution plate and partially overlapping the second baffle in the longitudinal direction of the pipe.

In accordance with another aspect of the present disclosure, the pipe is cylindrical, each of the plurality of baffles is semi-circular as a whole, an arc of the first baffle faces an arc of the second baffle and an overlapping portion of the first baffle and the second baffle, and an arc of the third baffle faces the arc of the second baffle and an overlapping portion of the third baffle and the second baffle.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings. It will be understood that although the terms first, second, etc. may be used herein to describe various elements, these elements should not be limited by these terms. These terms are only used to distinguish one element from another. It will be understood that when an element is referred to as being "connected with" another element, there may be intervening elements present. In contrast, it will be understood that when an element is referred to as being "directly connected with" another element, there are no intervening elements present. A singular representation may include a plural representation unless context clearly indicates otherwise. Terms such as "includes" or "has" used herein should be considered as indicating the presence of several components, functions or steps, disclosed in the specification, and it is also understood that more or fewer components, functions, or steps may likewise be utilized.

Figure 1:
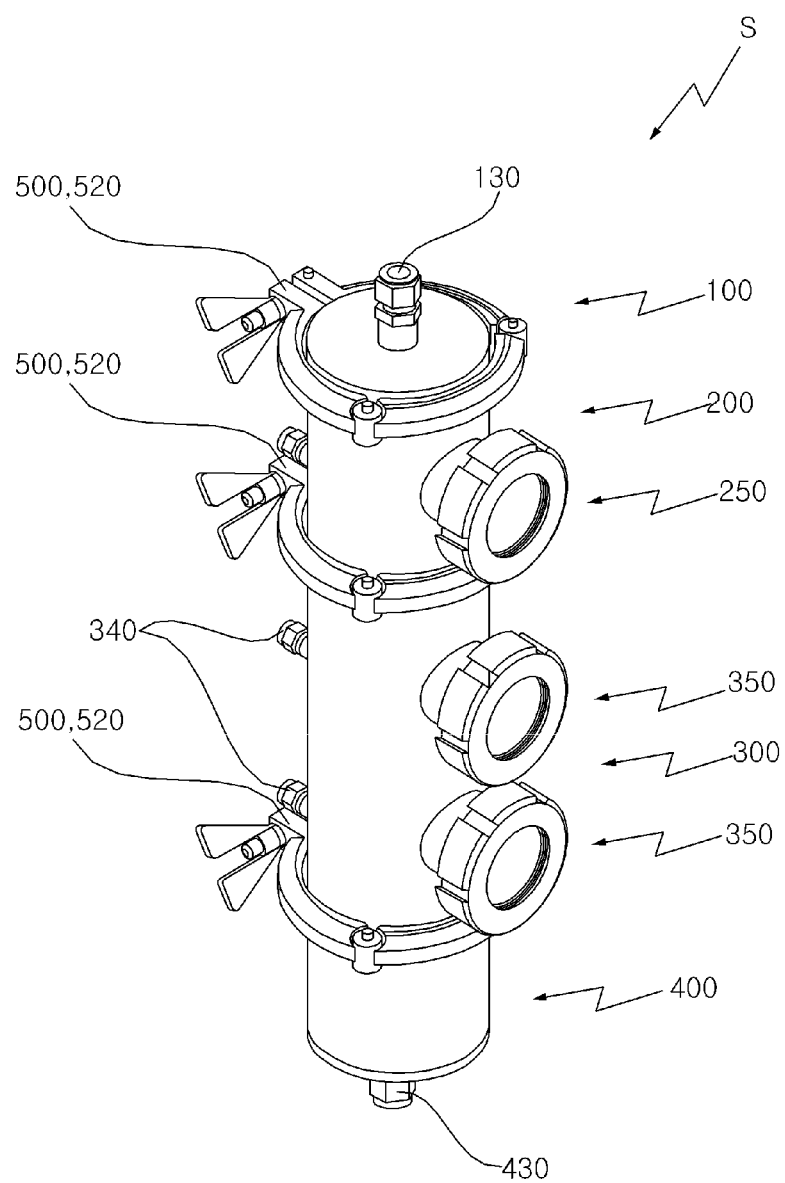
FIG. 1 is a view showing an example of a conventional fuel cell system related to the present disclosure.
Figure 2:
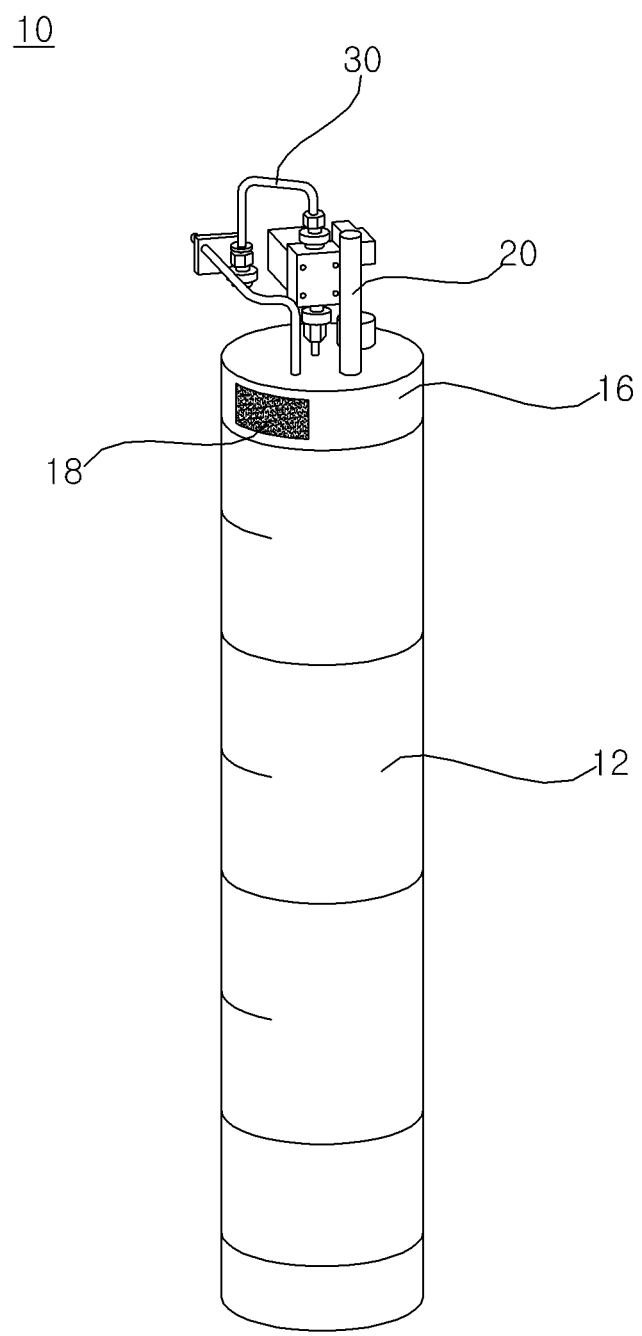
FIGS. 2 to 5 are views showing examples of a desulfurizer of a fuel cell system according to an embodiment of the present disclosure.

Referring to FIG. 2, a desulfurizer 10 may include a tank 12 and a cap 16. The tank 12 may have an elongated cylinder shape. The tank 12 may be referred to as a pipe 12. The tank 12 may have one end closed and the other end open. The cap 16 may be coupled to the other end of the tank 12 to close the open other end, thereby sealing the inside of the tank 12 from the outside. A transparent window 18 may form one side surface of the cap 16. The inside of the cap 16 can be observed through the transparent window 18. An inflow pipe 20 may be inserted from the outside of the tank 12 into the inside through the cap 16 in the longitudinal direction of the tank 12. An outflow pipe 20 may penetrate the cap 16 to communicate the inside and the outside of the cap 16.

Figure 3:
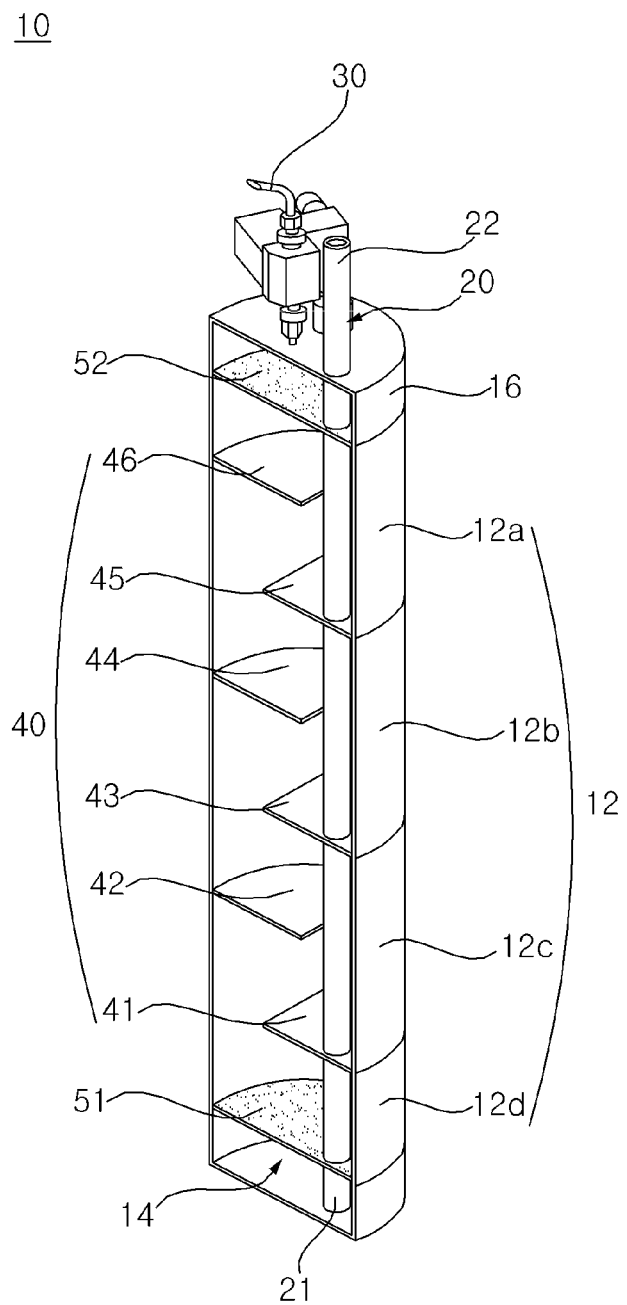

Referring to FIG. 3, baffles 40 may be installed inside the tank 12. The baffles 40 may be arranged spaced apart from each other sequentially in the longitudinal direction of the tank 12. The baffles 40 may have a thin plate shape. The baffles 40 may be arranged while forming a cross section of the tank 12.

A first baffle 41 may be positioned adjacent to the closed lower end of the tank 12. The first baffle 41 may face the closed lower surface of the tank 12. A second baffle 42 may be positioned above the first baffle 41 and spaced apart from the first baffle 41. The second baffle 42 may face or be parallel to the first baffle 41. A third baffle 43 may be positioned above the second baffle 42 and spaced apart from the second baffle 42. The third baffle 43 may face or be parallel to the second baffle 42.

A fourth baffle 44 may be positioned above the third baffle 43 and spaced apart from the third baffle 43. The fourth baffle 44 may face or be parallel to the third baffle 43. A fifth baffle 45 may be positioned above the fourth baffle 44 and spaced apart from the fourth baffle 44. The fifth baffle 45 may face or be parallel to the fourth baffle 44. A sixth baffle 46 may be positioned above the fifth baffle 45 and spaced apart from the fifth baffle 45. The sixth baffle 46 may face or be parallel to the fifth baffle 45. The baffles 40 may be, for example, semi-circular or half-moon shaped as a whole. For another example, the baffles 40 may have a fan shape. The baffles 40 may intersect or cross each other.

A first distribution plate 51 may be positioned between the lower surface of the tank 12 and the first baffle 41. The first distribution plate 51 is a disc substantially the same as the diameter of the tank 12, and may be a porous plate. A diffusion chamber 14 may be formed below the tank 12 by the first distribution plate 51.

A second distribution plate 52 may be positioned between the upper surface of the cap 16 of the tank 12 and the sixth baffle 46. The second distribution plate 52 is a disc substantially the same as the diameter of the cap 16, and may be a porous plate. A receiving space of the discoloration indicator may be formed in the cap 16 by the second distribution plate 52 and the cap 16.

The inflow pipe 20 may penetrate the second distribution plate 52, the fifth baffle 45, the third baffle 43, the first baffle 41, and the first distribution plate 51. The inflow pipe 20 may extend long from the upper surface of the cap 16 to the lower surface of the tank 12. One end 22 of the inflow pipe 20 may be positioned outside the cap 16, and the other end 21 penetrates the first distribution plate 51 and is adjacent to the lower surface of the tank 12, but may be spaced apart from the lower surface of the tank 12.

The tank 12 may include a first part 12a, a second part 12b, a third part 12c, a fourth part 12d, and a diffusion chamber 14. The desulfurizing agent may be filled in the first part 12a, the second part 12b, the third part 12c, and the fourth part 12d of the tank 12. Each of the first part 12a, the second part 12b, the third part 12c, and the fourth part 12d may be welded to each other in a cylinder shape and combined. Accordingly, it is possible to prevent the gas from leaking from the tank 12.

Figure 4:
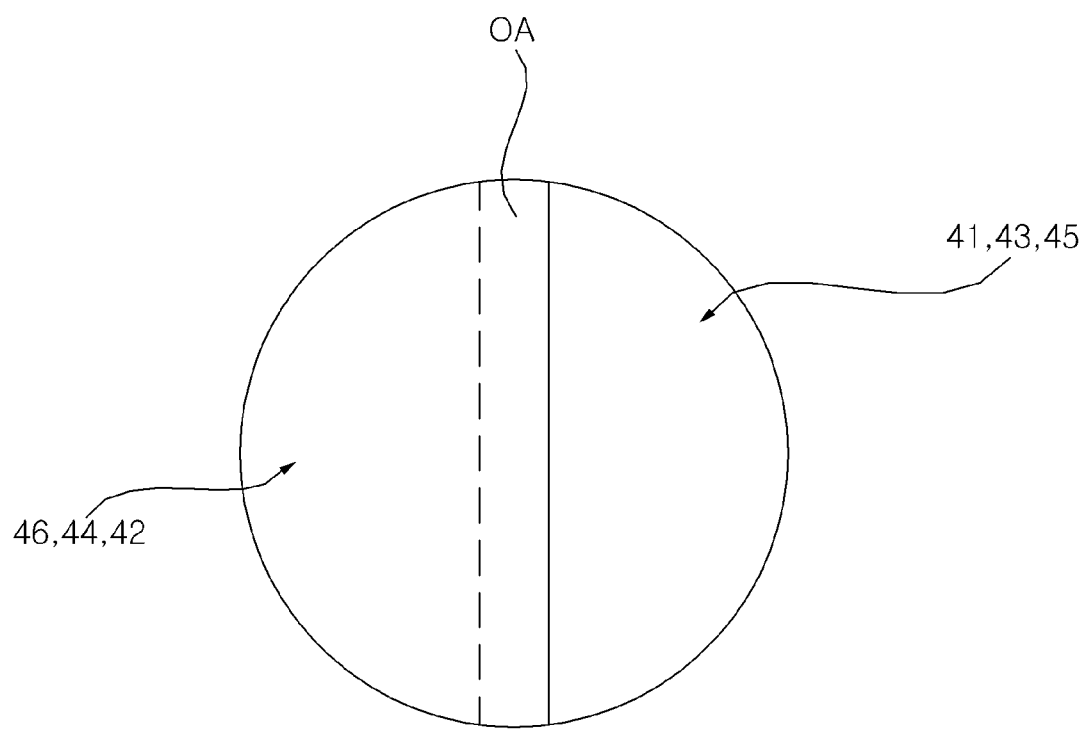

Referring to FIGS. 3 and 4, the first baffle 41 may include a second baffle 42 and an overlapping portion OA. The second baffle 42 may also include the first baffle 41 and the overlapping portion OA. The second baffle 42 is positioned while being spaced apart from the first baffle 41 in the upper side of the first baffle 41 to form an overlapping portion OA in which the first baffle 41 and the second baffle 42 are overlapped. The arc of the first baffle 41 may face or be symmetric with respect to the arc of the second baffle 42 and the overlapping portion OA.

The second baffle 42 may include the third baffle 43 and the overlapping portion OA. The third baffle 43 may also include the second baffle 42 and the overlapping portion OA. The third baffle 43 is positioned while being spaced apart from the second baffle 42 in the upper side of the second baffle 42 to form an overlapping portion OA in which the second baffle 42 and the third baffle 43 are overlapped. The arc of the second baffle 42 may face or be symmetrical with respect to the arc of the third baffle 43 and the overlapping portion OA.

The third baffle 43 may include the fourth baffle 44 and the overlapping portion OA. The fourth baffle 44 may also include the third baffle 43 and the overlapping portion OA. The fourth baffle 44 is positioned while being spaced apart from the third baffle 43 in the upper side of the third baffle 43 to form an overlapping portion OA in which the third baffle 43 and the fourth baffle 44 are overlapped. The arc of the third baffle 43 may face or be symmetric with respect to the arc of the fourth baffle 44 and the overlapping portion OA.

The fourth baffle 44 may include the fifth baffle 45 and the overlapping portion OA. The fifth baffle 45 may also include the fourth baffle 44 and the overlapping portion OA. The fifth baffle 45 is positioned in the upper side of the fourth baffle 44 while being spaced apart from the fourth baffle 44 to form an overlapping portion OA in which the fourth baffle 44 and the fifth baffle 45 are overlapped. The arc of the fourth baffle 44 may face or be symmetric with respect to the arc of the fifth baffle 45 and the overlapping portion OA.

The sixth baffle 46 may include the fifth baffle 45 and the overlapping portion OA. The fifth baffle 45 may also include the fourth baffle 44 and the overlapping portion OA. The sixth baffle 46 is positioned in the upper side of the fifth baffle 45 while being spaced apart from the fifth baffle 45 to form an overlapping portion OA where the fifth baffle 45 and the sixth baffle 46 are overlapped. The arc of the fifth baffle 45 may face with respect to the arc of the sixth baffle 46 and the overlapping portion OA.

Figure 5:
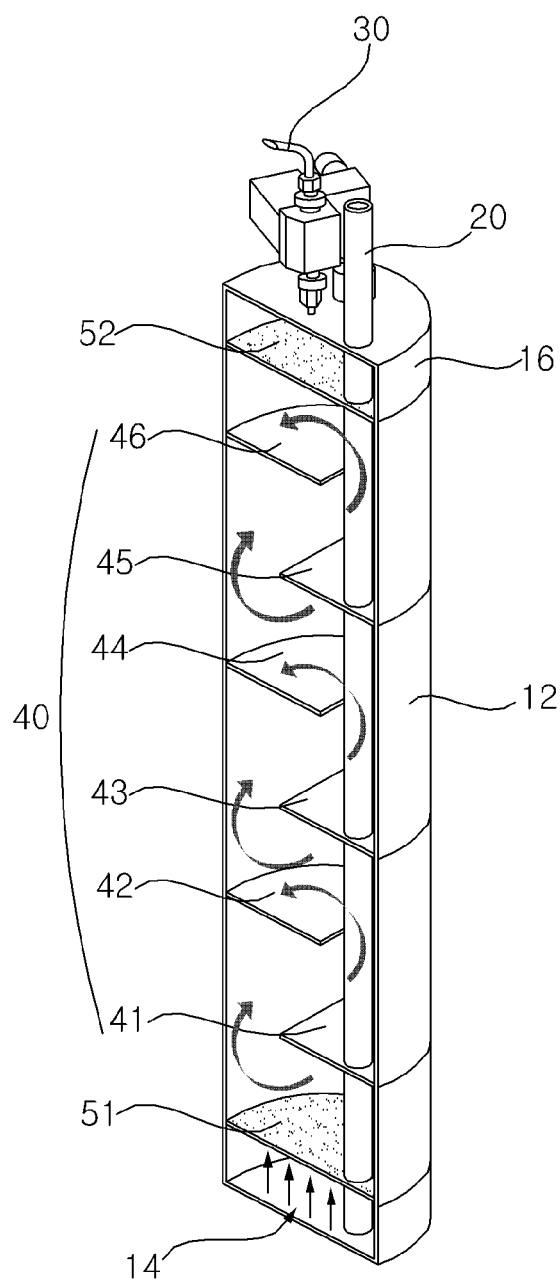

Referring to FIG. 5, gas may flow into the tank 12 through the inflow pipe 20. The gas may be directed to the diffusion chamber 14 through the inflow pipe 20, and reflected by the lower surface of the tank 12 in the diffusion chamber 14 to be directed to the first distribution plate 51. The gas may spread evenly through the porous first distribution plate 51. The gas spread to a space formed between the first distribution plate 51 and the first baffle 41 may be directed to a space formed by the first baffle 41 and the second baffle 42 while passing through the desulfurizing agent.

The gas may pass through the desulfurizing agent in a zigzag manner by the overlapping portion OA formed by the first baffle 41 and the second baffle 42. The gas may be directed to a space formed by the second baffle 42 and the third baffle 43. That is, the gas may pass through all the inner space of the tank 12 while passing through the first baffle 41 to the sixth baffle 46. The gas can evenly pass through the desulfurizing agent filled in the tank 12. Accordingly, the dead zone of the desulfurizing agent may not be formed.

The gas that passed through the sixth baffle 46 may pass through the second distribution plate 52 and flow into the inside of the cap 16. The gas that passed through the discoloration indicator in the inside of the cap 16 may flow to the outside of the tank 12 through the outflow pipe 30. The gas flowing to the outside of the tank 12 through the outflow pipe 30 may be a desulfurized and purified gas.

As described above, according to at least one embodiment of the present disclosure, it is possible to provide a desulfurizer for a fuel cell system that can extend the performance and life of the desulfurizing apparatus.

According to at least one embodiment of the present disclosure, it is possible to provide a desulfurizer for a fuel cell system capable of improving gas leakage.

According to at least one embodiment of the present disclosure, it is possible to provide a desulfurizer for a fuel cell system capable of improving the dead zone.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A desulfurizer comprising:
a pipe extended longitudinally and having one side that is open and the other side that is closed;
a cap coupled to the open one side of the pipe to close the open one side of the pipe;
a plurality of impermeable baffles installed in an inner space of the pipe and sequentially partitioning the inner space in a direction crossing a length direction of the pipe;
an inflow pipe penetrating through the cap and the plurality of baffles and communicating from the outside of the pipe to the inner space of the pipe; and
an outflow pipe installed in the cap and communicating the outside of the pipe and the inner space of the pipe;
wherein the inflow pipe has one end that is positioned outside of the pipe, and the other end that is adjacent to the closed other side of the pipe.

2. The desulfurizer of claim 1, wherein the plurality of baffles comprise:
a first baffle positioned adjacent to the other end of the inflow pipe; and
a second baffle positioned between the first baffle and the cap,
wherein parts of the first baffle and the second baffle are overlapped in a longitudinal direction of the pipe.

3. The desulfurizer of claim 2, further comprising:
a first distribution plate positioned between the first baffle and the other end of the inflow pipe, and partitioning the inner space of the pipe in a direction crossing the longitudinal direction of the pipe; and
a second distribution plate for partitioning the inner space of the pipe and an inner space of the cap,
wherein the first distribution plate and the second distribution plate are each a perforated plate.

4. The desulfurizer of claim 3, further comprising:
a desulfurizing agent filled in the inner space of the pipe between the first distribution plate and the second distribution plate; and
a discoloration indicator filled in the inner space of the cap.

5. The desulfurizer of claim 4, further comprising:
a third baffle positioned between the second baffle and the second distribution plate and partially overlapping the second baffle in the longitudinal direction of the pipe.

6. The desulfurizer of claim 5, wherein the pipe is cylindrical,
each of the plurality of baffles is semi-circular.

* * * * *